United States Patent
Kim et al.

(10) Patent No.: US 9,964,626 B2
(45) Date of Patent: May 8, 2018

(54) POSITIONING METHOD AND APPARATUS THEREFOR IN WIRELESS COMMUNICATION SYSTEM

(71) Applicants: LG ELECTRONICS INC., Seoul (KR); SNU R&DB FOUNDATION, Seoul (KR)

(72) Inventors: Hakseong Kim, Seoul (KR); Hanbyul Seo, Seoul (KR); Seonik Seong, Seoul (KR); Kwangbok Lee, Seoul (KR); Sunghyun Choi, Seoul (KR)

(73) Assignees: LG Electronics Inc., Seoul (KR); SNU R&DB Foundation, Seoul (KR)

( * ) Notice: Subject to any disclaimer, the term of this patent is extended or adjusted under 35 U.S.C. 154(b) by 0 days. days.

(21) Appl. No.: 15/328,856

(22) PCT Filed: Jul. 21, 2015

(86) PCT No.: PCT/KR2015/007571
§ 371 (c)(1),
(2) Date: Jan. 24, 2017

(87) PCT Pub. No.: WO2016/013852
PCT Pub. Date: Jan. 28, 2016

(65) Prior Publication Data
US 2017/0212206 A1    Jul. 27, 2017

Related U.S. Application Data

(60) Provisional application No. 62/028,785, filed on Jul. 24, 2014.

(51) Int. Cl.
| | |
|---|---|
| *G01S 5/00* | (2006.01) |
| *H04L 5/00* | (2006.01) |
| *H04L 12/26* | (2006.01) |
| *H04W 8/00* | (2009.01) |

(Continued)

(52) U.S. Cl.
CPC .......... *G01S 5/0072* (2013.01); *G01S 5/0036* (2013.01); *G01S 5/0063* (2013.01); *G01S 5/0205* (2013.01);
(Continued)

(58) Field of Classification Search
CPC ....... H04W 4/02; H04W 4/028; H04W 4/027; H04W 64/003; H04W 28/0226;
(Continued)

(56) References Cited

U.S. PATENT DOCUMENTS

| | | | |
|---|---|---|---|
| 2011/0111726 A1* | 5/2011 | Kholaif | ...................... G01S 1/68 455/404.2 |
| 2013/0281110 A1* | 10/2013 | Zelinka | ................. G01S 5/0284 455/456.1 |
| 2014/0274141 A1* | 9/2014 | Gholmieh | ............... H04W 4/02 455/456.3 |

FOREIGN PATENT DOCUMENTS

| | | |
|---|---|---|
| KR | 20130118953 | 10/2013 |
| WO | 2012091418 | 7/2012 |

(Continued)

OTHER PUBLICATIONS

International Application No. PCT/KR2015/007571, Search Report dated Oct. 27, 2015, 10 pages.

*Primary Examiner* — Kwasi Karikari
(74) *Attorney, Agent, or Firm* — Lee Hong Degerman Kang Waimey

(57) ABSTRACT

A method for performing positioning for estimating position in a wireless communication system according to the present invention comprises transmitting, by a first UE, a positioning request message for performing the positioning to an eNB; transmitting, by the eNB, an anchor request message to neighboring UEs within a cell to find UEs which may become a second UE; receiving, the eNB, an anchor response message corresponding to a response to the anchor
(Continued)

request message from at least one UE from among neighboring UEs within the cell; and determining, by the eNB, the second UE based on the received anchor response message.

15 Claims, 19 Drawing Sheets

(51) Int. Cl.
    *G01S 5/02*     (2010.01)
    *H04W 88/02*     (2009.01)
    *H04W 88/08*     (2009.01)

(52) U.S. Cl.
    CPC ............ *H04L 5/0048* (2013.01); *H04L 43/16* (2013.01); *H04W 8/005* (2013.01); *H04W 88/02* (2013.01); *H04W 88/08* (2013.01)

(58) Field of Classification Search
    CPC ..... H04W 84/12; H04W 88/08; H04W 88/02; H04W 4/025; H04W 52/0209; H04W 8/08; G06F 17/30241; G06F 1/3215; H04L 67/22; H04L 43/04
    See application file for complete search history.

(56) References Cited

FOREIGN PATENT DOCUMENTS

| WO | 2013025057 | 2/2013 |
| WO | 2013062351 | 5/2013 |
| WO | 2013119077 | 8/2013 |

* cited by examiner

POSITIONING METHOD AND APPARATUS THEREFOR IN WIRELESS COMMUNICATION SYSTEM

CROSS-REFERENCE TO RELATED APPLICATIONS

This application is the National Stage filing under 35 U.S.C. 371 of International Application No. PCT/KR2015/007571, filed on Jul. 21, 2015, which claims the benefit of U.S. Provisional Application No. 62/028,785, filed on Jul. 24, 2014, the contents of which are all hereby incorporated by reference herein in their entirety.

TECHNICAL FIELD

The present invention relates to a wireless communication system and more particularly, a method for performing positioning in a wireless communication system supporting device-to-device communication and an apparatus supporting the method.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

Direction communication between devices, that is, device-to-device (D2D) communication, refers to a communication method for setting up a direct link between a plurality of devices (e.g., a plurality of types of user equipments (UE) and directly exchanging voice and data between the plurality of devices without the intervention of an evolved NodeB (eNB).

DISCLOSURE

Technical Problem

An object of the present invention is to provide a method for performing positioning for estimating the position of a UE by using sidelink communication.

Also, an object of the present invention is to newly define a discovery signal format for performing positioning by using sidelink communication.

Also, an object of the present invention is to newly define a resource area allocated to an anchor UE only among the discovery signal resource area for performing positioning by using sidelink communication.

Also, an object of the present invention is to provide a method for performing positioning by using a centroid algorithm.

The technical objects to achieve in this document are not limited to those technical objects described above, but other technical objects not mentioned above may be clearly understood by those skilled in the art to which the present invention belongs from the specifications give below.

Technical Solution

A method for performing positioning for estimating position in a wireless communication system according to the present invention comprises a first UE's transmitting a positioning request message for performing the positioning to an eNB; the eNB's transmitting an anchor request message to neighboring UEs within a cell to find UEs which may become a second UE, wherein the second UE holds its own position information and is capable of supporting the first UE's performing positioning; the eNB's receiving an anchor response message corresponding to a response to the anchor request message from at least one UE from among neighboring UEs within the cell; the eNB's determining the second UE on the basis of the received anchor response message; the eNB's transmitting a position request message for commanding the determined second UE to transmit position of the determined second UE to the first UE by using sidelink communication; the determined second UE's transmitting its position information to the first UE by using the sidelink communication; and the first UE's performing positioning by using the received position information of the second UE.

Also, the anchor response message according to the present invention is received from a UE which may become the second UE among neighboring UEs within the cell.

Also, the anchor request message according to the present invention further comprises coverage restriction information so that only those UEs satisfying a specific condition among neighboring UEs within a cell may transmit the anchor response message.

Also, the coverage restriction information according to the present invention is approximate position information of the first UE, and the specific condition requires that difference in distance from the approximate position of the first UE is smaller than a threshold value.

Also, the approximate position information of the first UE according to the present invention is position information measured on the basis of positioning reference signal (PRS).

Also, a method for performing positioning for estimating position in a wireless communication system according to the present invention comprises a first UE's transmitting a positioning request message for performing the positioning to an eNB; the eNB's transmitting a reference signal request message including reference signal (RS)-related resource information to be used for position estimation to the first UE; the eNB's transmitting a listening request message for requesting neighboring UEs within a cell to receive the reference signal transmitted from the first UE; the first UE's transmitting the reference signal to the neighboring UEs within the cell; determining on the basis of received signal strength of the reference signal whether the neighboring UEs within the cell may become a second UE, wherein the second UE holds its own position information and is capable of supporting the first UE's performing positioning; the second UE's transmitting its position information to the first UE by using sidelink communication; and the first UE's performing positioning by using the received position information of the second UE.

Also, the neighboring UEs within the cell according to the present invention receive the reference signal in case the neighboring UEs may become the second UE.

Also, a method for performing positioning for estimating position in a wireless communication system according to the present invention comprises a first UE's receiving a discovery signal from neighboring UEs; the first UE's determining the second UE on the basis of the received discovery signal, wherein the second UE holds its own position information and is capable of supporting the first UE's performing positioning; the first UE's receiving position information of the second UE through sidelink communication from the determined second UE; and the first UE's performing positioning by using position information of the received position information of the second UE.

Also, the discovery signal according to the present invention includes control information which indicates whether a UE may become the second UE.

Also, the discovery signal according to the present invention is received through a specific area of a discovery signal resource area, and the specific area is a resource area defined only for the second UE to transmit the discovery signal.

Also, the discovery signal according to the present invention is a periodic discovery signal.

Also, a UE performing positioning for estimating position in a wireless communication system according to the present invention comprises an RF (Radio Frequency) unit for transmitting and receiving a radio signal; and a processor being connected functionally to the RF unit and controlling the UE, wherein the processor is configured to receive a discovery signal from neighboring UEs; to determine an anchor UE on the basis of the received discovery signal; to receive position information of the anchor UE through sidelink communication from the determined anchor UE; and to control the UE to perform positioning by using the received position information of the anchor UE, wherein the anchor UE holds its own position information and is capable of supporting the UE's performing positioning.

Advantageous Effects

According to the present invention, position of a UE may be estimated more accurately in an indoor environment or in an emergency situation by using sidelink communication.

Also, since the present invention newly defines a discovery signal format for performing positioning by using sidelink communication, position of a UE may be estimated more accurately without relying on a support from an eNB.

The advantageous effects that may be obtained from the present invention are not limited to the effects described above, but other advantageous effects not mentioned above may be clearly understood by those skilled in the art to which the present invention belongs.

BRIEF DESCRIPTION OF THE DRAWINGS

The accompanying drawings, which are included as part of a detailed description to provide further understanding of the invention, illustrate embodiments of the invention and together with the description serve to explain the principles of the invention.

MODE FOR INVENTION

Figure 1:
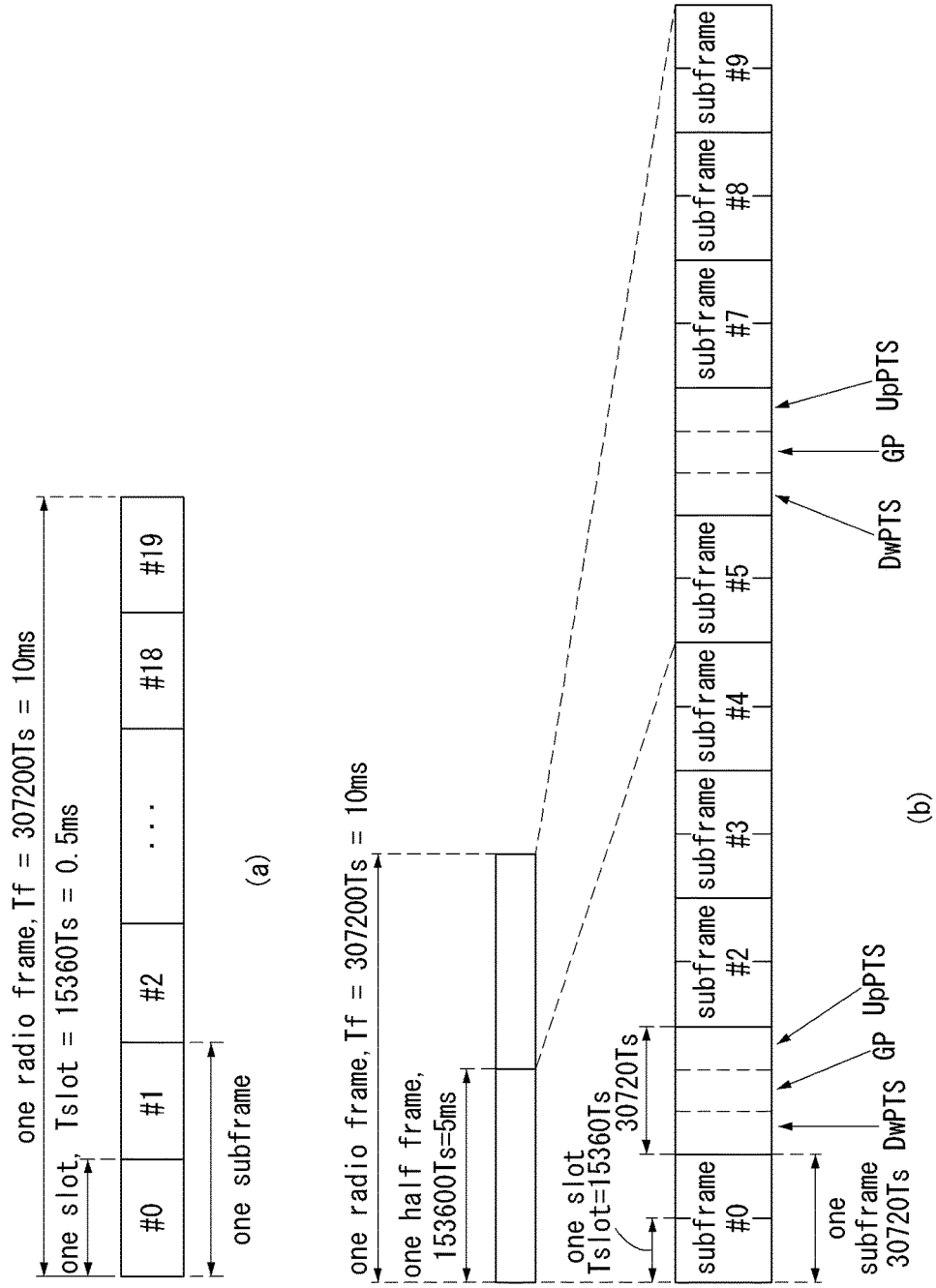
FIG. 1 illustrates a structure of a radio frame in a wireless communication system to which the present invention may be applied.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

Figure 2:
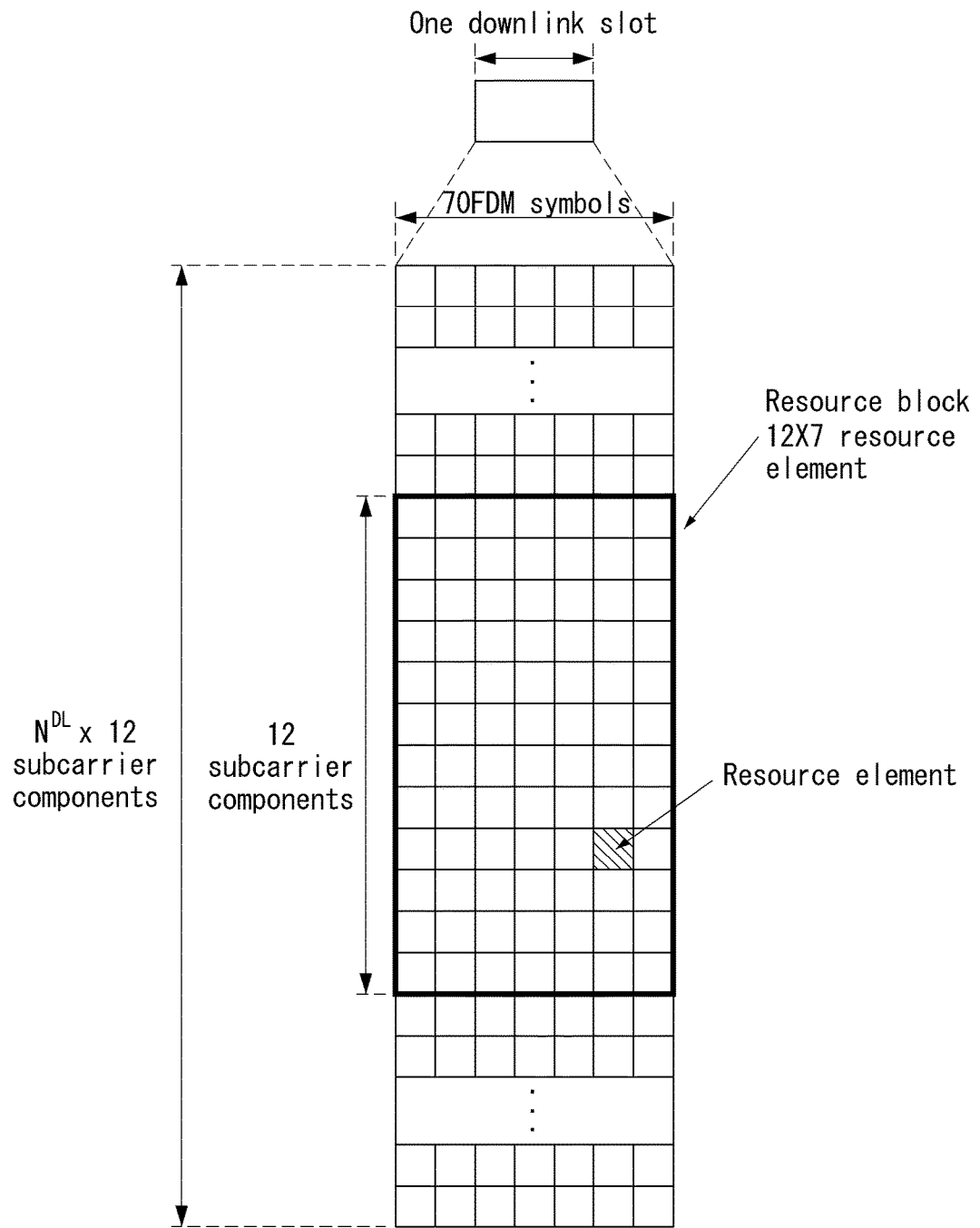
FIG. 2 illustrates resource grids for one downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
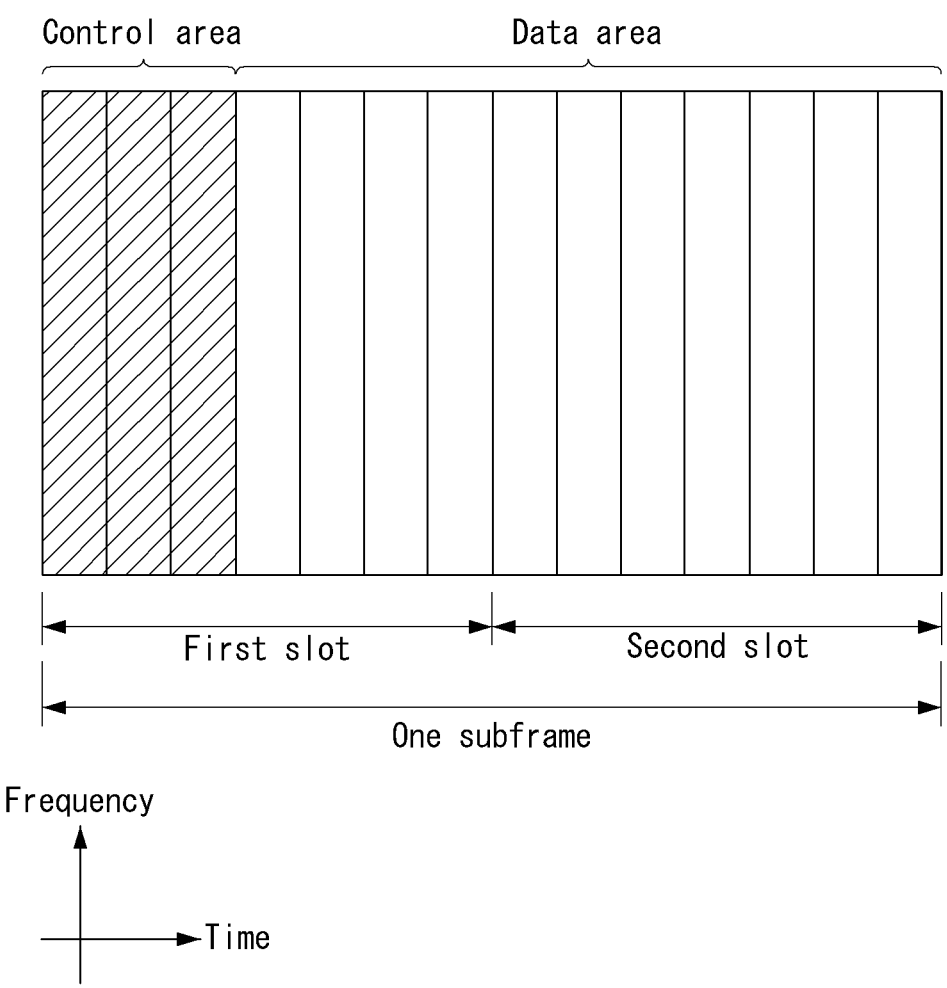
FIG. 3 illustrates a structure of a downlink subframe in a wireless communication system to which the present invention may be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
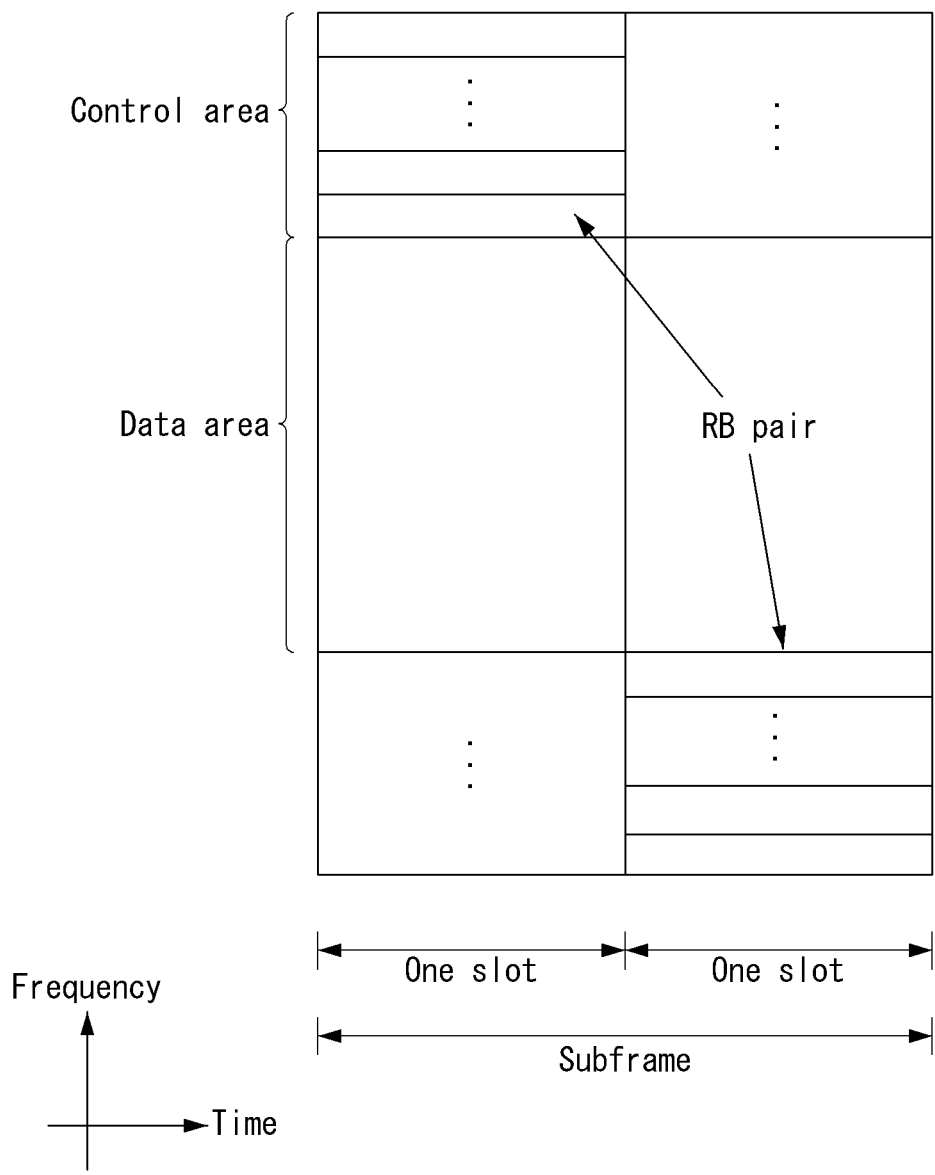
FIG. 4 illustrates a structure of a uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

OTDOA (Observed Time Difference of Arrival) Method

In what follows, OTDOA method will be described in more detail.

Figure 5:
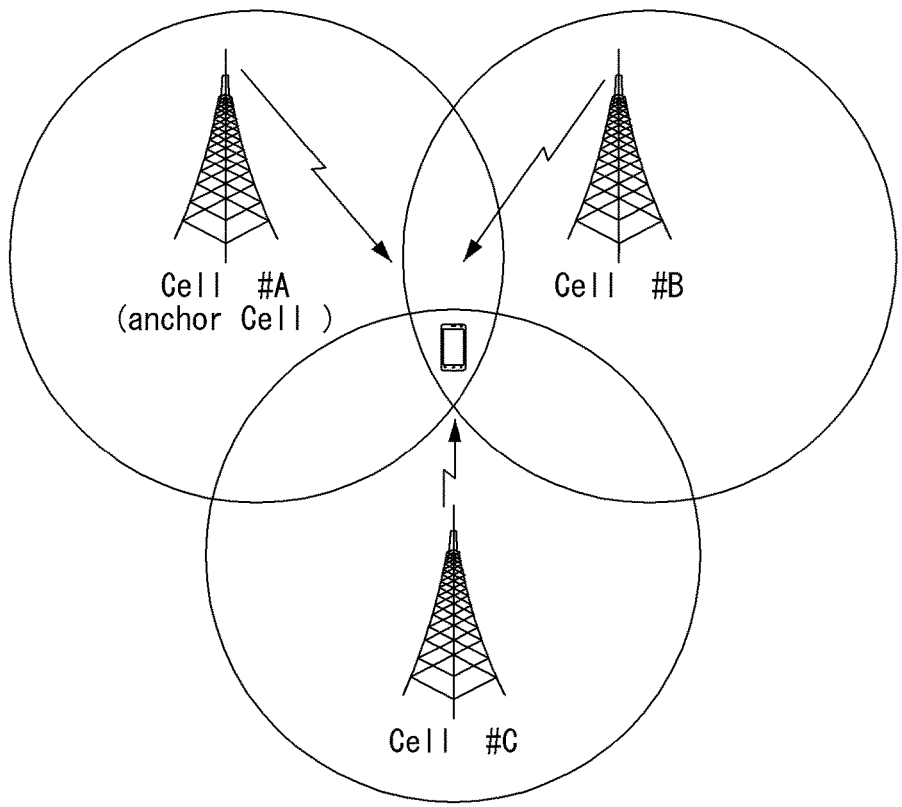
FIG. 5 illustrates OTDOA method for determining position of a UE.

FIG. 5 illustrates OTDOA method for determining position of a UE.

With reference to FIG. 5, since the UE performs a reference clock with respect to a subframe transmitted from a current serving cell, signals received from neighboring cells show different TOAs (Time Of Arrival) from each other.

The servicing cell and the neighboring cell may be expressed as a serving eNB and a neighboring eNB, respectively.

In other words, OTDOA method measures position of a UE by using the time difference of signals transmitted from the respective cells to arrive at the UE; since a reference cell works as a timing reference of TDOA, the reference cell measures the time taken to receive a signal from one reference cell and time delay of a signal received from each of a plurality of neighboring cells by using a reference signal or synchronization signal received from the plurality of neighboring cells and reports the measurement to a serving cell or an anchor cell, after which the serving cell measures position of the corresponding UE by using the reported time delays.

At this time, the reference cell denotes a cell that may be used as a reference of TDOA (Time Difference Of Arrival). A serving cell may correspond to the reference cell. In case the UE performs an handover operation, a serving cell before the handover operation is performed may correspond to the reference cell, or the reference cell may not be changed regardless of the handover operation of the UE.

As a measurement signal for determining position of a UE, a CRS (Common Reference Signal) or PSS/SSS (Primary Synchronization Signal/Secondary Synchronization Signal) may be used, but a PRS (Positioning Reference Signal) dedicated to LCS (LoCation Service) may be used.

The positioning reference signal (PRS) may be denoted as a position determination reference signal or position determination pilot signal.

The PRS (Positioning Reference Signal) is used for determining position of a UE and is transmitted only through resource blocks of a downlink subframe determined for PRS transmission.

Position Determination Method for UE

Next, a position determination method for a UE will be described.

In other words, according to the PRS-based position determination method for UEs, a UE receives assistance data from a serving eNB, receives a PRS from a reference cell and neighboring cells by using the assistance data, calculates a reference signal time difference (in what follows, it is called "RSTD") between the reference cell and neighboring cells, and transmits the RSTD to the serving eNB.

Afterwards, the serving eNB transmits the RSTD to a location server, and the location server determines position of the UE by using the RSTD.

The RSTD indicates a relative timing difference between the reference cell and neighboring cells, which is defined by the mathematical equation below.

$$T_{subframeRxj} - T_{subframeRxi} \quad [\text{Eq. 1}]$$

In Eq. 1, $T_{subframeRxj}$ represents the time at which the UE receives a start time of one subframe from a neighboring cell j, and $T_{subframeRxi}$ represents the time at which the UE receives from the reference cell i the start time of one subframe closest to the subframe received from the cell j.

In case a reference cell and neighboring cells are capable of transmitting the PRS around the same time, and the reference cell and neighboring cells transmit the PRS around the same time, the time difference between the time at which the UE receives the PRS from the reference cell and the time at which the UE receives the PRS from each of a plurality of neighboring cells lies within a predetermined time range.

For example, the time difference between the time at which the UE receives the PRS from the reference cell and the time at which the UE received the PRS from each of the plurality of neighboring cells may be less than one subframe.

Then, assuming from the definition of the RSTD that one subframe that the UE receives from a neighboring cell j is the first subframe for PRS positioning occasions of the neighboring cell j, one subframe received from the cell i closest to the subframe received from cell j becomes the first subframe for PRS positioning occasions of the reference cell i.

At this time, the PRS positioning occasions indicate consecutive downlink subframes to which the PRS is allocated. Therefore, the RSTD becomes the time difference between the time at which the PRS is received from the neighboring cell j and the time at which the PRS is received from the reference cell i.

At this time, the time point at which the PRS is received from a specific cell is called time of arrival (in what follows, it is called "TOA") of the PRS.

In what follows, a position determination method for a UE by using PRS will be described in more detail with reference to FIG. 6.

Figure 6:
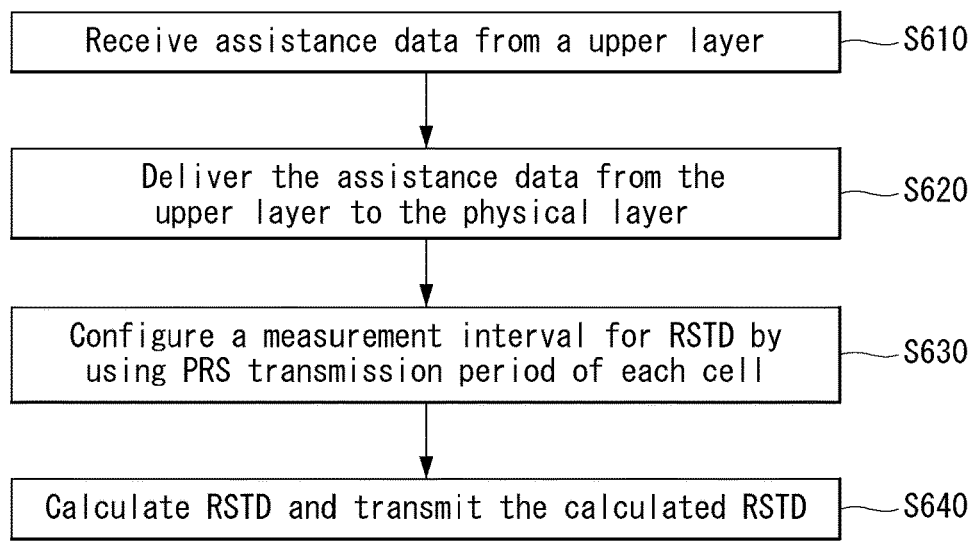
FIG. 6 is a flow diagram illustrating one example of a method for determining position of a UE.

FIG. 6 is a flow diagram illustrating one example of a method for determining position of a UE.

As shown in FIG. 6, the upper layer of the UE receives assistance data from a location server S610.

The assistance data may include information about reference cell and/or at least one neighboring cell required to calculate the RSTD.

After receiving the assistance data, the upper layer of the UE delivers the assistance data to the physical layer S620.

Afterwards, the physical layer of the UE sets up a measurement interval for RSTD by using the PRS transmission period of each of the plurality of cells as specified by the assistance data S630.

Once the measurement interval for the RSTD of each of the plurality of cells is set up by using the PRS transmission period, the UE calculates the RSTD according to the measurement interval and transmit or report the calculated RSTD value to the location server S640.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

Figure 7:
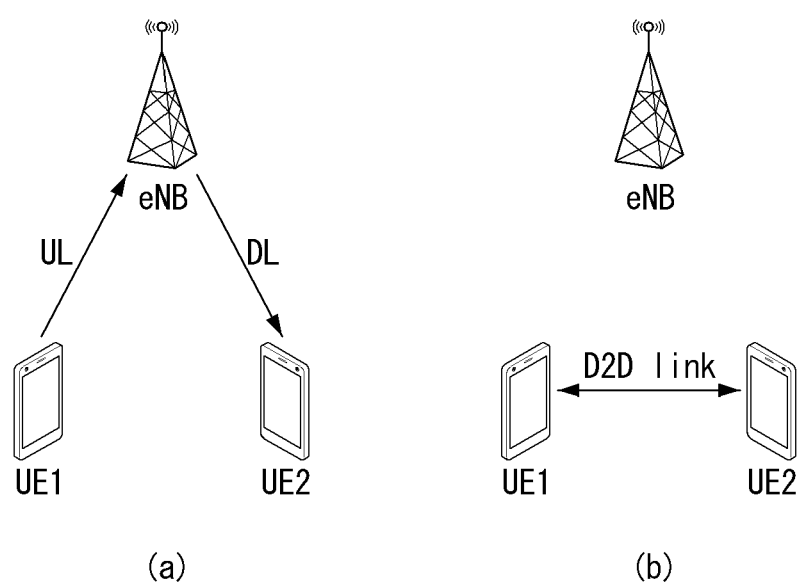
FIG. 7 illustrates D2D communication in a wireless communication system to which the present invention may be applied.

FIG. 7 is a diagram for schematically describing the D2D communication in a wireless communication system to which the present invention may be applied.

FIG. 7*a* illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 7*b* illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

Figure 8:
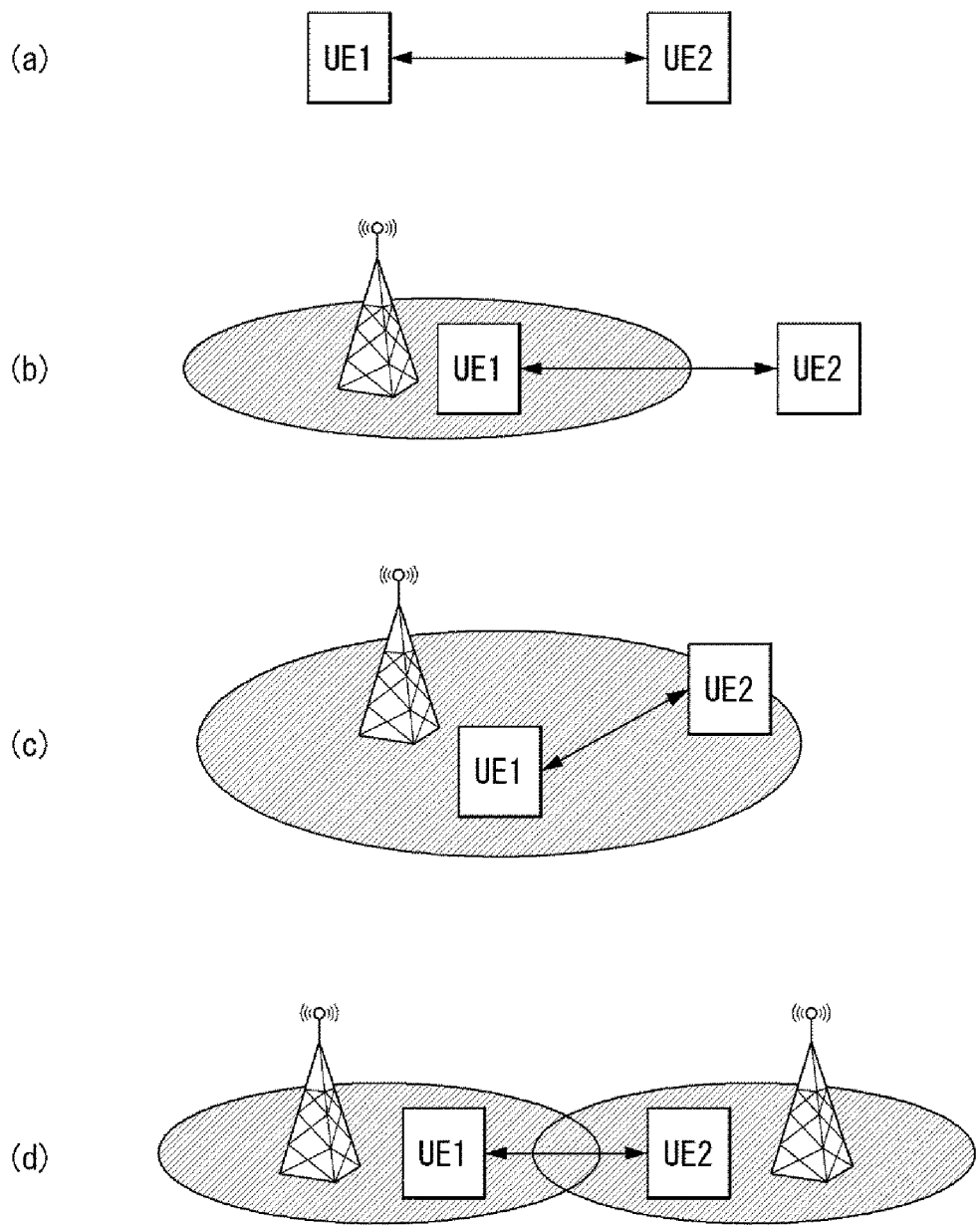
FIG. 8 illustrates one example of various scenarios of D2D communication to which a method according to the present invention may be applied.

FIG. 8 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 8a illustrates an example of an out-of-coverage network scenario of the D2D communication.

The out-of-coverage network scenario means perform the D2D communication between the D2D UEs without control of the base station.

In FIG. 8a, only the UE1 and the UE2 are present and the UE1 and the UE2 may directly communicate with each other.

FIG. 8b illustrates an example of a partial-coverage network scenario of the D2D communication.

The partial-coverage network scenario means performing the D2D communication between the D2D UE positioned in the network coverage and the D2D UE positioned out of the network coverage.

In FIG. 8b, it may be illustrated that the D2D UE positioned in the network coverage and the D2D UE positioned out of the network coverage communicate with each other.

FIG. 8c illustrates an example of the in-coverage-single-cell and FIG. 8d illustrates an example of the in-coverage-multi-cell scenario.

The in-coverage network scenario means that the D2D UEs perform the D2D communication through the control of the base station in the network coverage.

In FIG. 8c, the UE1 and the UE2 are positioned in the same network coverage (alternatively, cell) under the control of the base station.

In FIG. 8d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 8, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

In what follows, a method for estimating position of a UE according to the present invention will be described with reference to related drawings.

This document defines a positioning protocol for a specific UE to estimate its position by collecting information from neighboring UEs through D2D communication.

The positioning protocol according to the present invention may be divided largely into (1) a method for collecting position information of neighboring UEs and (2) a method for estimating position of a UE by using the collected information.

At this time, the former method (1), namely the method for collecting position information of neighboring UEs may include 1) cell-covered protocol, 2) UE-covered protocol, and 3) UE-covered protocol using discovery signal.

Also, the latter method (2) may include 1) a ranging-based positioning method and 2) a ranging-free positioning method.

In what follows, the method (1) and (2) will be described in more detail with reference to related drawings.

In the following, for the convenience of description, positioning, namely, a UE attempting position estimation is called a target UE and is denoted as $UE_t$.

Also, those UEs (neighboring UEs) capable of helping the $UE_t$ perform positioning by providing their position information are denoted as potential anchors (PAs).

Furthermore, it is assume that the target UE and potential anchors are all capable of performing D2D communication (or sidelink communication).

Each potential anchor is assumed to have information about its own position, and type of information about the position may include geographic position information obtained through GPS or Wi-Fi AP and time difference (DoA) information collected through OTDOA (Observed Time Difference Of Arrival).

Figure 9:
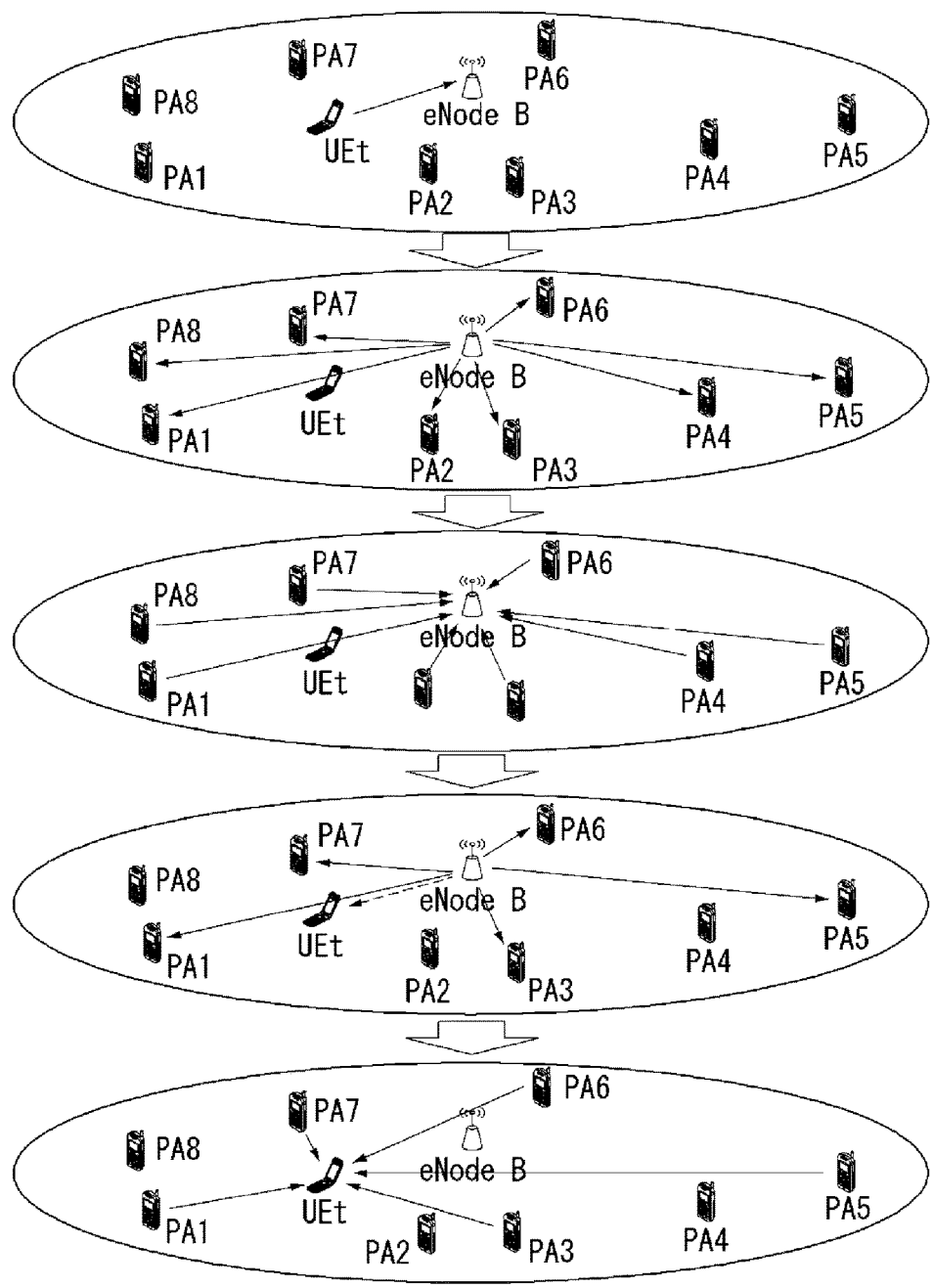
FIG. 9 illustrates one example of a position estimation model of a UE according to the present invention.

FIG. 9 illustrates one example of a position estimation model of a UE according to the present invention.

In FIG. 9, information about the position of $PA_n$, which is the n-th potential anchor, may be expressed by $X_n$, $DOA_n$, respectively.

In the figure, $X_n$ may be absolute position information of $PA_n$ obtained through GPS, and $DOA_n$ may be the relative position information of $PA_n$ obtained through OTDOA.

As shown in FIG. 9, the dashed line arrow directed from an eNB (eNodeB) to a target UE represents auxiliary information (related to position estimation) that the target UE receives from the eNB, and the solid line arrow directed from a neighboring PA to the target UE represents position information such as $DOA_n$ and $X_n$ or indirect position confirmation information such as DoA.

The auxiliary information will be described in more detail with reference to FIGS. 10 to 14.

As described above, a method for a target UE to estimate position of a $UE_t$ by using the position information collection protocol used for collecting information of $DOA_1$, $DOA_2, \ldots, DOA_K$ or $X_1, X_2, \ldots, X_K$ respectively from neighboring $PA_1, PA_2, \ldots, PA_K$ and the collected information.

In other words, position estimation methods for a target UE may be divided into three methods according to a subject and a method for a specific operation: (1) cell-covered, (2) UE-covered, and (3) UE-covered method using discovery signal.

Cell-Covered Protocol

First, a cell-covered protocol will be described.

A cell-covered protocol refers to the positioning method based on D2D communication (sidelink communication) for supporting positioning of the entire UEs within a cell.

Figure 10:
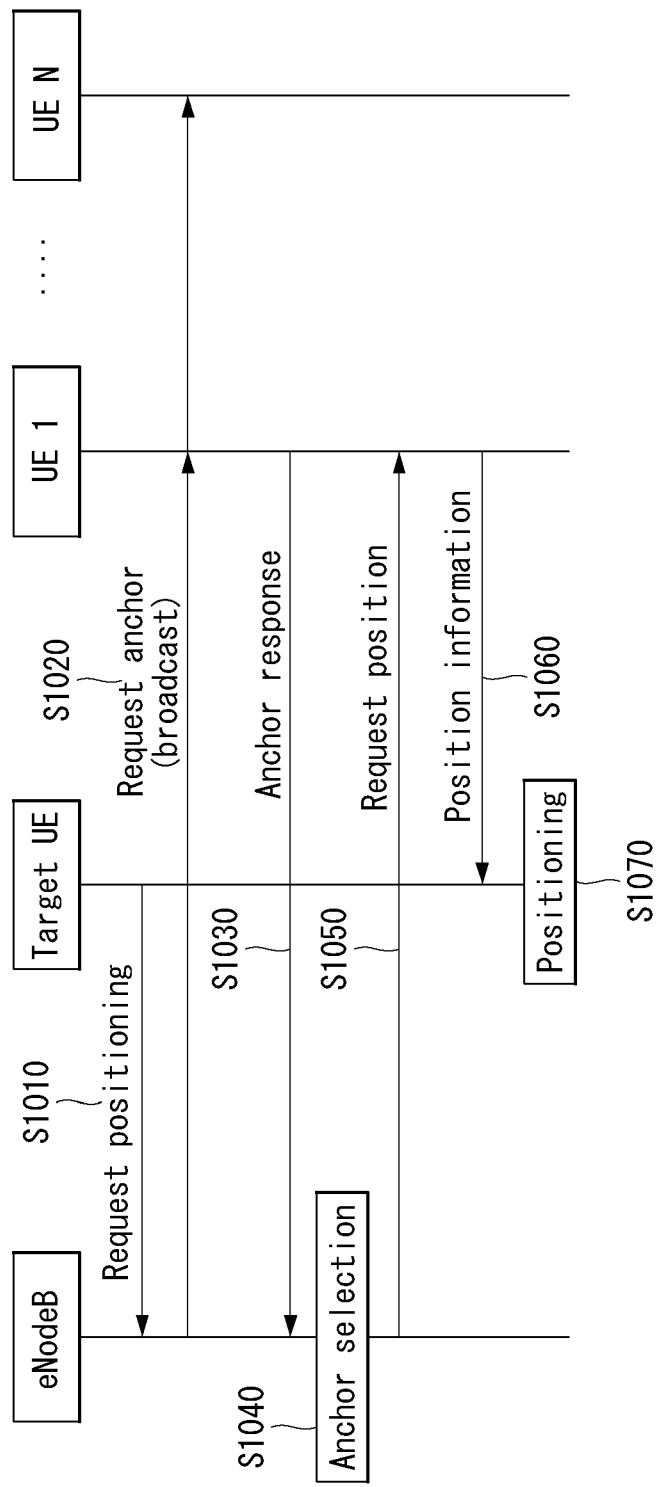
FIG. 10 is a flow diagram illustrating one example of a position estimation method according to the present invention.

FIG. 10 is a flow diagram illustrating one example of a position estimation method according to the present invention.

In other words, FIG. 10 illustrates a signal delivery process of the cell-covered protocol.

With reference to FIG. 10, as a UE performing positioning (target UE) transmits a positioning request message to the eNB S1010, the positioning protocol is initiated.

The positioning request message may include PRS (Positioning Reference Signal) information and pilot signal.

Also, the PRS information and pilot signal may be transmitted to neighboring UEs as a separate message, and in this case, the neighboring UEs may perform a responding operation separately in response to the transmission.

Afterwards, the eNB which has received the positioning message transmits an anchor request message to the UEs within the cell (of the eNB) through broadcasting S1020.

The anchor request message represents a message transmitted to neighboring UEs by the eNB to find those UEs being aware of their position and capable of serving as anchors.

Afterwards, the UE being aware of its position and capable of serving as an anchor from among the UEs within the cell which have received the anchor request message transmits an anchor response message to inform the eNB of its capability S1030.

In other words, the eNB may know which UEs in the cell are capable of performing the role of the anchor at which positions by collecting the anchor response message.

After figuring out the UEs to perform the role of the anchor in the S1030 step, the eNB performs an anchor selection process to determine which UEs to perform the role of the anchor to cover the whole cell S1040.

The anchor selection may be expressed as UE relay selection.

Afterwards, the eNB transmits a position request message which requests potential anchor(s) (PAs) selected in the S1040 step to transmit the position information of the eNB as an actual anchor to the target UE through D2D communication S1050.

Afterwards, the anchor UEs which have received the position request through the S1050 step transmit their position information to $UE_t$ through sidelink communication S1060.

Next, the $UE_t$ performs positioning to determine its position S1070.

As described above, the cell-covered protocol may be characterized in that all of the anchors selected within the coverage of the eNB broadcast their position-related information.

At this time, to limit the number of selected anchors (to limit the coverage), the eNB may transmit an anchor request message including a particular condition to the UEs within the cell.

In particular, in case an approximate position of a target UE is known, the eNB may deliver the corresponding information along with the anchor request message, thereby making only a limited number of UEs provide an anchor response and may select an actual anchor from among the limited number of UEs.

UE-Covered Protocol

Next, UE-covered protocol will be described.

The UE-covered protocol supports D2D communication based positioning only in the vicinity of a target UE, $UE_t$.

While the cell-covered protocol serves anchors selected from the entire eNBs to transmit their own position information, the UE-covered protocol allows only the anchors distributed in the surroundings of $UE_t$ to be activated, and hence it may be more efficient than the cell-covered protocol.

Also, in such a system having a large number of UEs attempting positioning at the same time, the cell-covered protocol may be utilized more efficiently.

Figure 11:
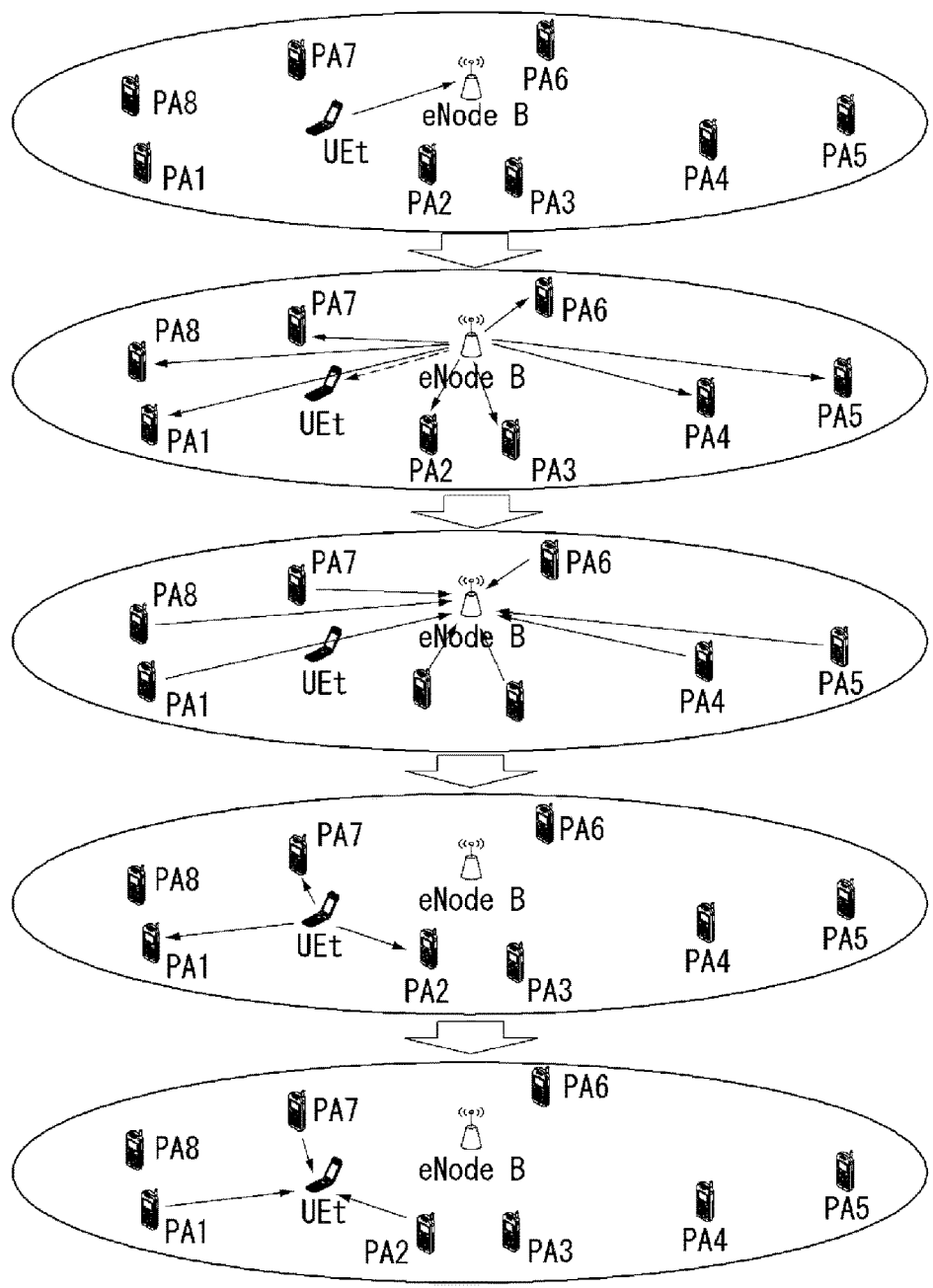
FIG. 11 illustrates one example of a position estimation model based on UE-covered protocol according to the present invention.
Figure 12:
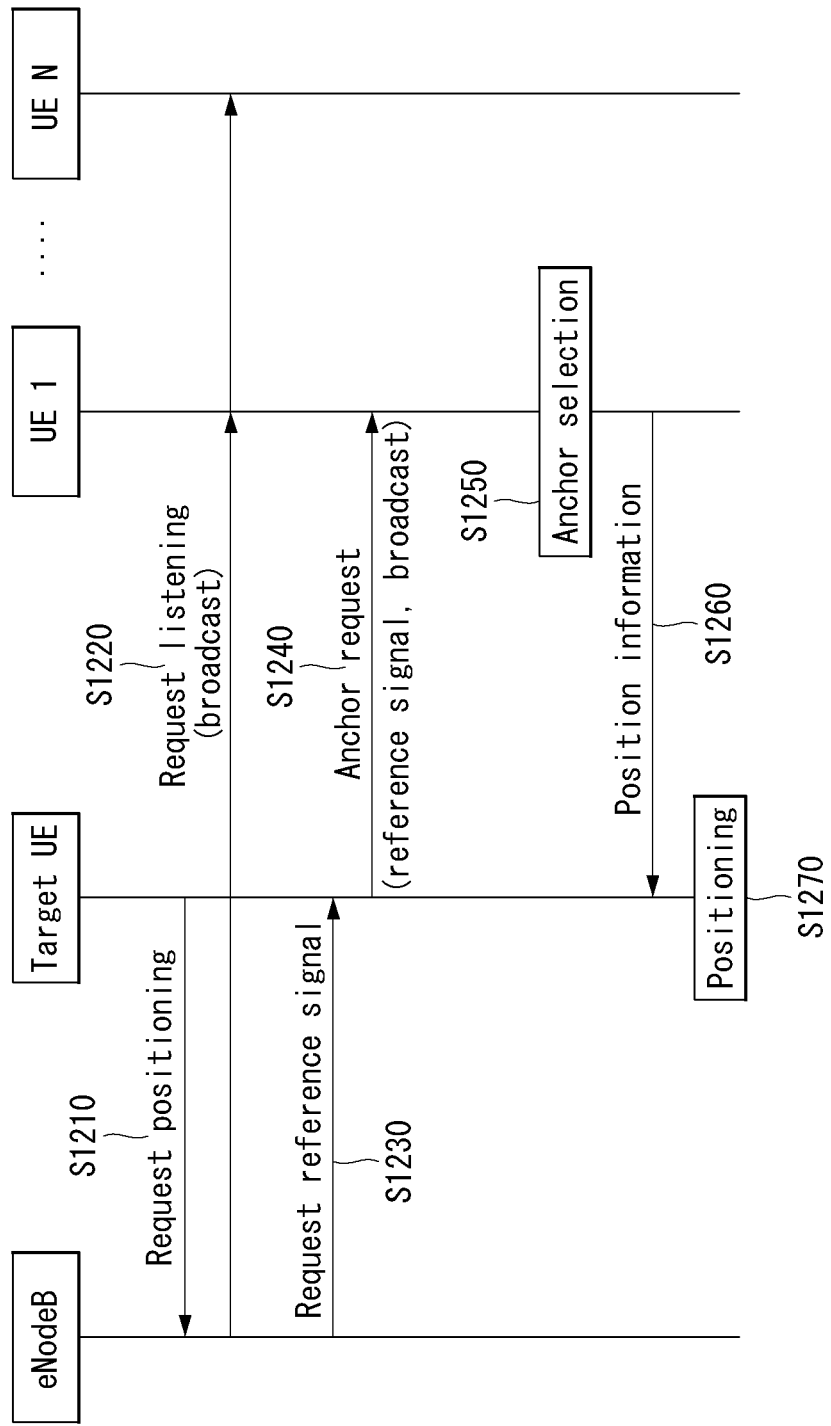
FIG. 12 is a flow diagram illustrating another example of a position estimation method according to the present invention.

FIG. 11 illustrates one example of a position estimation model based on UE-covered protocol according to the present invention, and FIG. 12 is a flow diagram illustrating another example of a position estimation method according to the present invention.

In other words, FIG. 12 illustrates a signal delivery process based on the UE-covered protocol.

With reference to FIG. 12, in the same way as the cell-covered protocol, the UE-covered protocol is started with the operation sequence that the $UE_t$ attempting to perform positioning transmits a positioning request to the eNB S1210.

Next the eNB allocates resources by which to transmit a reference signal S1230.

The resource allocation related to the reference signal may be performed through a reference signal request message.

Also, the eNB requests the UEs within the cell to receive the reference signal from the $UE_t$ in case the UEs are capable of serving as anchors S1220.

The corresponding process may be performed through a listening request message, and the listening request message may be broadcast.

In other words, the processes described above performs scheduling so that a target UE which has transmitted a positioning request message (or initiated the message) transmits a positioning reference signal to neighboring UEs and performs separate scheduling for neighboring UEs so that they may receive the corresponding positioning reference signal.

Examples of the scheduling may include time-frequency resource, sequence type/index, periodicity, and timing relationship.

Also, the scheduling may be implemented as neighboring UEs overhear the target UE scheduling message transmitted by the target UE, or the target UE transmits a separate RX UE scheduling message (control information) to neighboring UEs.

From received signal strength of the reference signal transmitted by the $UE_t$, those UEs capable of serving as anchors may be distinguished only for the UEs located in the vicinity of the $UE_t$.

In other words, potential anchors determine from the received signal strength of the reference signal transmitted by $UE_t$ whether to perform the role of anchors. In case the potential anchors determine to serve as anchors, the potential anchors support the $UE_t$ to perform positioning by transmitting position information (or indirect information for position estimation such as DoA) of the potential anchors to the $UE_t$ through D2D communication S1240~S1260.

Afterwards, the $UE_t$ which has received position information from the anchor UEs estimates its position from received positions of the anchors S1270.

UE-Covered Using Discovery Signal

Next, UE-covered using discovery signal protocol will be described.

Figure 13:
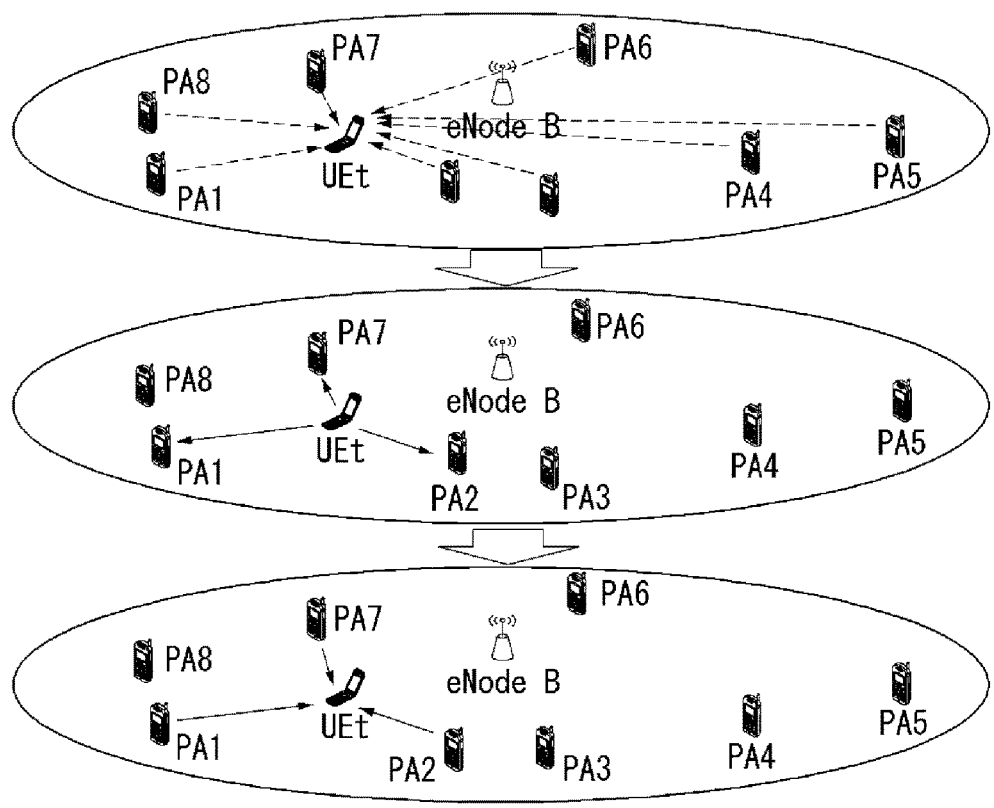
FIG. 13 illustrates one example of a position estimation model based on UE-covered protocol using a discovery signal according to the present invention.
Figure 14:
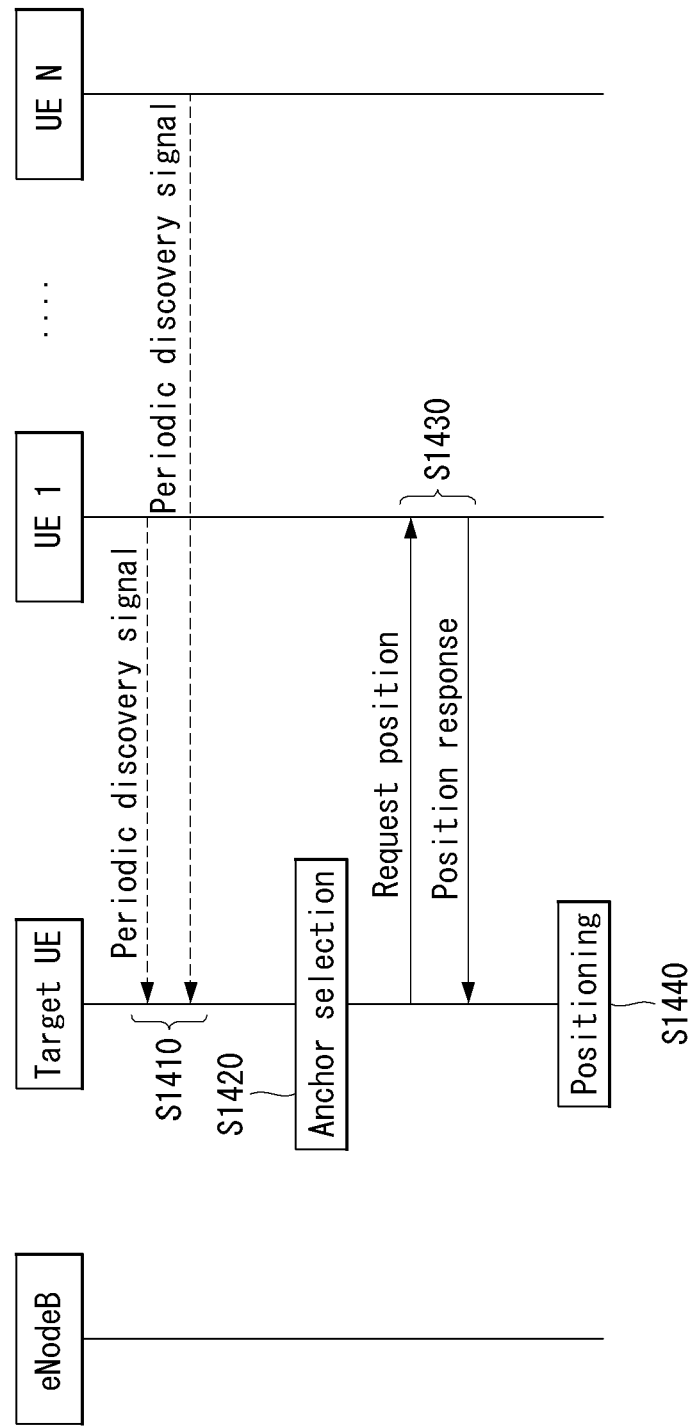
FIG. 14 is a flow diagram illustrating a yet another example of a position estimation method according to the present invention.

FIG. 13 illustrates one example of a position estimation model based on UE-covered protocol using a discovery signal according to the present invention, and FIG. 14 is a flow diagram illustrating a yet another example of a position estimation method according to the present invention.

In other words, FIG. 14 illustrates a signal delivery process according to the UE-covered protocol using a discovery signal.

As described above, the cell-covered protocol method and the UE-covered protocol method may be regarded as active position estimation methods in which a UE ($UE_t$) trying to obtain position information initiates the positioning process.

Differently from the two protocols, the UE-covered protocol using a discovery signal refers to the passive position estimation method in which a discovery signal is used for positioning, the discovery signal being transmitted periodically as in the D2D technology (sidelink technology) of the LTE system.

In other words, the UE-covered protocol using a discovery signal refers to the method in which a target UE performs positioning through information exchange between UEs without an eNB being involved in the positioning.

With reference to FIG. 14, neighboring UEs (potential anchors, UE 1, UE 2, . . . , UE N) transmit a periodic discovery signal to the target UE through a sidelink S1410.

For transmission of the periodic discovery signal, the discovery signal transmission method (y times transmission through x subframe, where x and y are natural numbers) defined in the LTE sidelink communication may be applied.

In the following, the discovery signal will be described in more detail.

In other words, the discovery signal according to the present invention refers collectively to the signal transmitted periodically or non-periodically for the purpose of search to determine existence of neighboring UEs as in the LTE D2D (sidelink) communication.

The $UE_t$ attempting positioning by using a periodically transmitted discovery signal may receive a discovery signal from neighboring (D2D-enabled) UEs.

At this time, to utilize D2D communication for the purpose of positioning, the target UE should first be able to determine which of the neighboring UEs may properly perform as anchors on the basis of the received discovery signal.

Those UEs capable of serving as anchors may transmit their position information or position auxiliary information such as DoA by including the information in the discovery signal.

However, in case the position information is transmitted by being included in the discovery signal, it may undesirable in terms of privacy or since the message size of a periodically transmitted signal is increased.

Therefore, instead of using a method for transmitting the position information (or position estimation indirect information) by including the position information in a discovery signal, a potential anchor check bit indicating capability of a UE to serve as an anchor may be newly defined and transmitted by being added to the discovery signal.

Figure 15:
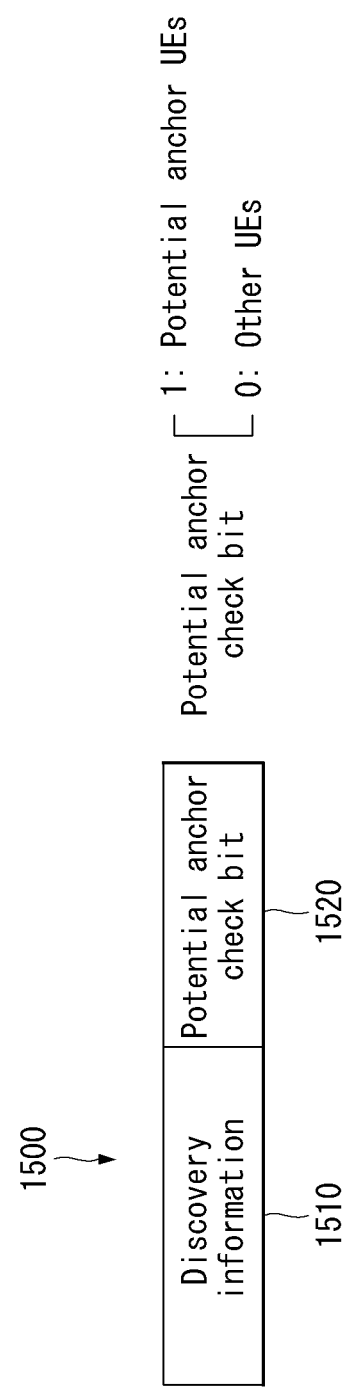
FIG. 15 illustrates one example of a discovery signal format including a potential anchor check bit according to the present invention.

FIG. 15 illustrates one example of a discovery signal format including a potential anchor check bit according to the present invention.

With reference to FIG. 15, the discovery signal 1500 includes discovery information 1510 and potential anchor check bit 1520.

As described above, the potential anchor check bit (field) is control information indicating whether a UE transmitting a discovery signal is capable of serving as an anchor, size of which may be 1 bit.

As one example, in case the potential anchor check bit is '1', it indicates that a UE is capable of serving as an anchor; on the other hand, in case the potential anchor check bit is '0', it indicates that the UE is incapable of serving as an anchor.

As another embodiment, a method for partitioning discovery signal resources may be taken into account as a method for displaying capability of a UE for serving as an anchor through a discovery signal.

Figure 16:
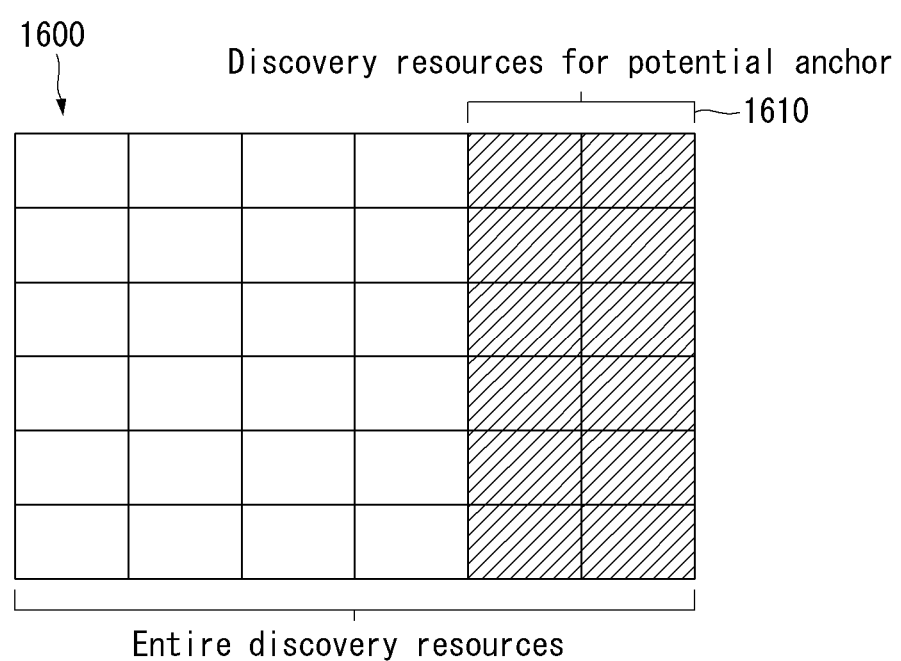
FIG. 16 illustrates one example of a method for classifying a potential anchor by using discovery resource partitioning according to the present invention.

FIG. 16 illustrates one example of a method for classifying a potential anchor by using discovery resource partitioning according to the present invention.

In other words, FIG. 16 illustrates one example of discovery resources for supporting positioning based on partitioning of discovery resource areas.

As shown in FIG. 16, among the entire resources 1600 for the discovery signal, part of the resources 1610 is defined as the resources 1610 though which only the UEs capable of serving as anchors may transmit a discovery signal.

In this case, the discovery resource area 1610 available only for the UEs capable of serving as anchors may be allocated in advance to the UEs capable of serving as anchors.

Therefore, in case the corresponding resource area 1610 is allocated only to the UEs capable of serving as anchors, the UE attempting to perform positioning receives only the corresponding resources and finds neighboring UEs by detecting a discovery signal received with more than predetermined power from among the resources.

In this way, once a UE becomes capable of distinguishing a potential anchor by using a periodically transmitted discovery signal, the UE may find neighboring anchors without signal exchange with an eNB when performing positioning.

Afterwards, after finding neighboring anchors by using a discovery signal, the target UE may find its own position by obtaining position information from the corresponding anchors through D2D communication as in the S1430 and S1440 steps.

At this time, in addition to D2D communication, the position information may be obtained through cellular communication via an eNB.

Afterwards, the target UE performs anchor selection for determining a UE capable of serving as an anchor on the basis of a received discovery signal S1420.

Afterwards, the target UE transmits a position request message to the anchor selected through the S1420 step S1430.

Afterwards, the selected anchor UE 1 transmits a position response message to the target UE in response to the position request message S1430.

Through the process above, the target UE performs positioning, namely position estimation S1440.

Table 2 below compares the three methods and summarizes the comparison result: (1) cell-covered protocol, (2) UE-covered protocol, and (3) UE-covered protocol using discovery signal.

TABLE 2

|  | Cell-covered | UE-covered | UE-covered using discovery signal |
| --- | --- | --- | --- |
| Covered area | Cell | Vicinity of target UE | Vicinity of target UE |
| Active/passive | Active | Active | Passive |
| Signaling overhead in positioning | Very high | High | Low |
| Anchor selection | eNodeB | Potential anchors | Target node |
| Number of anchor | $\propto$ cell size | $\propto$ anchor density | Constant |

Position Estimation Method Based on Collected Position-Related Information

Next, the method for estimating position of a target UE by using collected position information will be described in more detail.

In the above, three protocol methods collecting position information from neighboring UEs through D2D (sidelink) communication have been described: cell-covered protocol, UE-covered protocol, and UE-covered protocol using discovery signal.

A method for estimating position of a target UE by using collected position related information according to the three protocol methods may be implemented in various ways.

In particular, a method for estimating position of a target UE ($UE_t$) may be divided largely into (1) ranging-based positioning and (2) ranging-free positioning according to whether the $UE_t$ measures distance to the anchor.

Since performance of a UE is lower than that of an eNB in the D2D based positioning and signals that may be transmitted are restricted, ranging accuracy is low, but ranging-free positioning may be preferable because of the possibility that many neighboring UEs may be utilized.

In what follows, the ranging-free positioning method will be described in more detail.

The ranging-free positioning method may utilize a centroid scheme.

The ranging-free positioning method based on the centroid scheme calculates the position of a target UE by applying position information of neighboring anchors to the centroid algorithm.

The mathematical equation 2 estimates position of a target UE by applying the centroid algorithm.

$$X_t = \frac{X_1 + X_2 + \ldots + X_K}{K} \qquad [\text{Eq. 2}]$$

As shown in Eq. 2, $UE_t$ estimates its position $X_t$ by averaging position information collected from neighboring anchors.

At this time, $X_1, X_2, \ldots, X_K$ denotes position information collected from neighboring anchors.

At this time, as shown in Eq. 3 below, optimized position estimation may be performed by applying weights to the collected information in addition to the simple averaging scheme.

Each weight may be determined according to the quality of a signal received from the corresponding neighboring UE or according to a predetermined UE.

$$X_t = \frac{w_1 X_1 + w_2 X_2 + \ldots + w_k X_K}{K} \quad [\text{Eq. 3}]$$

In an indoor scenario in which many anchors in the vicinity of a target UE have accurate position information obtained from GPS or Wi-Fi APs, the target UE may estimate its position by directly receiving position information from the neighboring anchors.

Also, in a public safety scenario, there are times when anchors do not know their exact position, and in this case, the target UE may estimate its own position through PRS (Positioning Reference Signal) of an eNB.

In case a PRS is used, a target UE and an eNB (or network) may estimate their position by exchanging DOA (Difference Of Arrival) information.

The $UE_t$ collects DOA information measured from the surroundings thereof and estimates its position by using the collected DOA information.

The position estimation method according to the present invention described above is not limited to position estimation of a particular UE.

In the position estimation method described above, a target UE estimates its position by using position information collected from neighboring anchor UEs.

Afterwards, as the next step, the UE, which once was a target UE, may become an anchor UE again and support a different target UE to perform position estimation.

In other words, information from the anchor UE at the first timing may enable the target UE at the first timing to perform position estimation, and then at the second timing, the target UE of the first timing may become the anchor UE again (if it is assumed that the target UE is selected as an anchor) to support the target UE at the second timing to perform position estimation.

As described above, in the PRS-based method, position information of a particular anchor UE is propagated to a neighboring target UE that attempts to know the position information, and the target UE becomes the anchor again so that position information may be propagated to other UEs which need the position information.

This operation scheme may be expressed by a message flooding method, which may be applied effectively for an emergency disaster situation in which a specific UE or eNB delivers an urgent message to neighboring UEs.

In other words, to ensure accuracy of position estimation in such a situation, anchors may include information indicating how many steps are to be taken for position estimation into the message transmitted to target UEs so that the target UEs may know history information describing the propagation process from an originated anchor node (UE).

On the other hand, the history information may not only simply display the steps to be taken but also deliver additional information expressing accuracy of each step.

As described above, the additional information expressing accuracy of each step may eventually be selected by a target UE in the anchor selection step or utilized by the target UE as weights.

Also, the additional information may also be used as a criterion by which a target examine its relevancy for an anchor UE when making a response as an anchor UE.

Also, an information flooding method comprising several steps may commonly apply the following schemes.

First, RSTD (Reference Signal Time Difference) measurement of each UE is transmitted to a neighboring UE through D2D communication, and the target UE may report the RSTD measurement sent from the neighboring UE (for example, a UE of which the D2D signal RX power is higher than a predetermined level) to the network (or eNB) together with its own RSTD measurement or report the average value of RSTD measurements.

The first method may be desirable when a neighboring UE is in an idle mode (or idle state).

In the second method, while reporting RSTD measurement to the network, each UE also reports information about UEs in the vicinity thereof (neighboring UEs described above) to the network so that the network may determine which UE's report to be used together for location calculation.

The second method may be desirable when neighboring UEs are in a connected state.

According to the first and the second method for using RSTD measurements described above, information about neighboring UEs may be configured in advance by the network.

Figure 17:
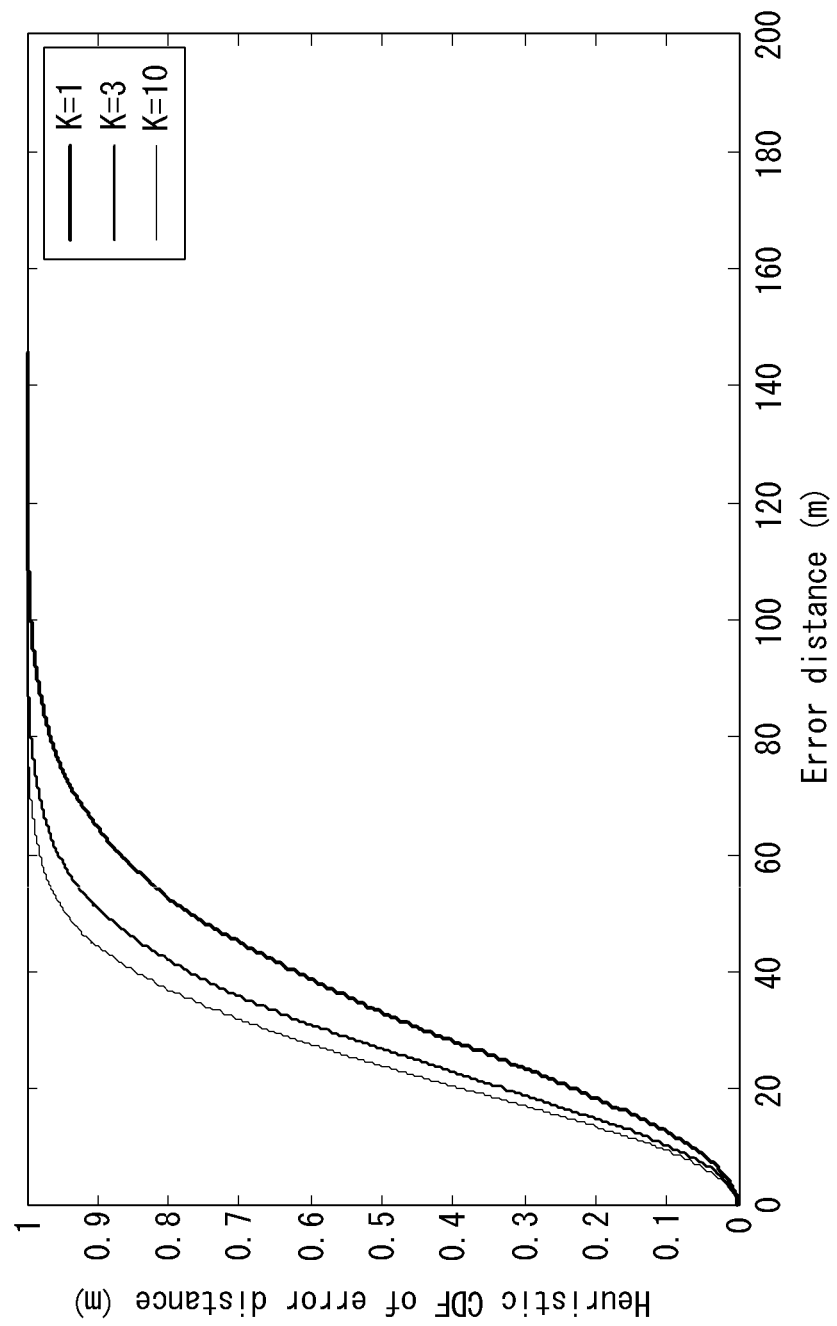
FIGS. 17 to 19 illustrate examples of performance of D2D communication-based positioning according to the present invention.
Figure 18:
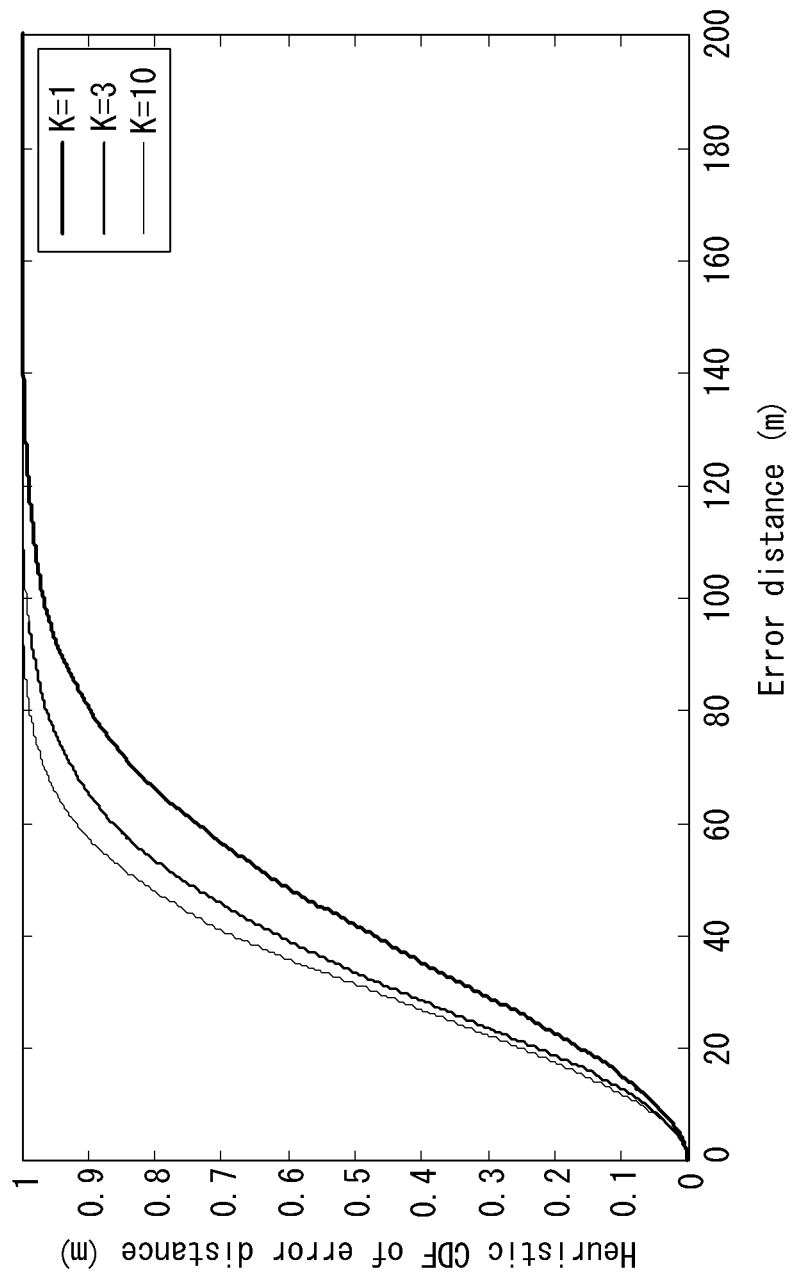
Figure 19:
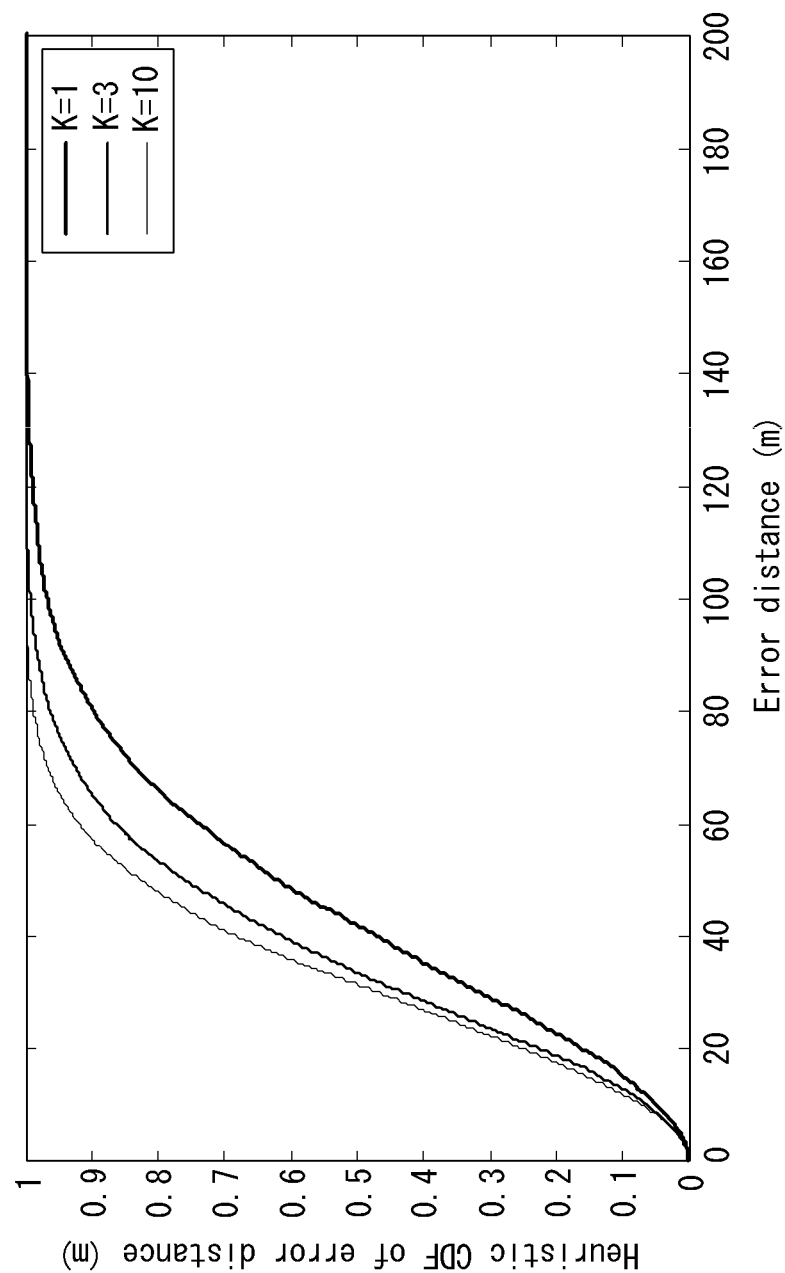

FIGS. 17 to 19 illustrate examples of performance of D2D communication-based positioning according to the present invention.

In other words, given that performance of D2D communication based positioning is performed according to the model described below, simulation results of FIGS. 17 to 19 may be obtained.

In the following, the number of potential anchors located within around 250 m of the target UE is expressed as N, and among the potential anchors, the number of anchors which are actually selected and receive position information is expressed as K.

Since the position information of each anchor is in fact inaccurate, modeling of the position information is needed.

Therefore, FIGS. 17 to 19 assume that the position error follows a Gaussian distribution along the x and y axis, which is located around the actual position.

The simulation is performed with a simulation setting that variance of Gaussian error is 20, and average error distance due to the variance is 25.1 m.

FIGS. 17 to 19 show simulation results of D2D communication based positioning when N is 50, 30, and 10, respectively.

In the case of FIGS. 17 to 19, centroid of received anchor positions is taken as an estimate of the position of the target UE, and the distribution of error between estimated and actual position is expressed in the form of a CDF (Cumulative Distribution Function).

With reference to FIGS. 17 to 19, it may be confirmed that D2D communication-based positioning method provides high accuracy; and the higher the density of neighboring potential anchors and the larger the number of actually employed anchors, the more accurately the position of the target UE may be estimated.

At this time, it may be seen from FIGS. 17 to 19 that the density of neighboring potential anchors provides a greater influence on performing positioning according to the present invention than the number of anchors sharing position information.

Apparatus to which the Present Invention May be Applied

Figure 20:
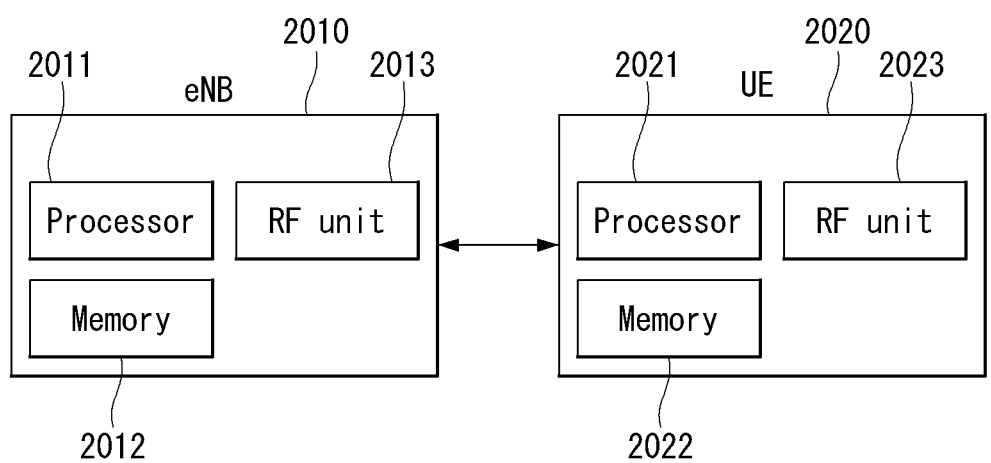
FIG. 20 illustrates one example of an internal block diagram of a wireless communication device to which methods according to the present invention may be applied.

FIG. 20 illustrates one example of an internal block diagram of a wireless communication system to which method according to the present invention may be applied.

With reference to FIG. 20, a wireless communication system comprises an eNB 2010 and a plurality of UEs 2020 located within the communication range of the eNB 2010.

The eNB 2010 includes a processor 2011, a memory 2012, and an RF (Radio Frequency) unit 2013. The processor 2011 implements functions, processes and/or methods proposed in FIG. 1 to FIG. 19. The layers of a wireless interface protocol may be implemented by the processor 2011. The memory 2012 is connected to the processor 2011 and stores various information for driving the processor 2011. The RF unit 2013 is connected to the processor 2011 and transmits and/or receives radio signals.

The UE 2020 includes a processor 2021, a memory 2022, and an RF (Radio Frequency) unit 2023. The processor 2021 implements functions, processes and/or methods proposed in FIG. 1 to FIG. 19. The layers of a wireless interface protocol may be implemented by the processor 2021. The memory 2022 is connected to the processor 2021 and stores various information for driving the processor 2021. The RF unit 2023 is connected to the processor 2021 and transmits and/or receives radio signals.

The memory 2012, 2022 may be located inside or outside the processor 2011, 2021, and may be coupled to the processor 2011, 2021 by using various well-known means. Also, the eNB 2010 and/or UE 2020 may have a single or multiple antennas.

The embodiments described above are combinations of constituting elements and characteristics of the present invention in a predetermined manner. Each individual constituting element or characteristic has to be considered to be selective unless otherwise explicitly stated. Each individual constituting element or characteristic may be implemented so that it is not combined with other constituting elements or characteristics. Also, the embodiment of the present invention may be implemented by combining part of the constituting elements and/or characteristics. The order of operations described in the embodiments of the present invention may be changed. Part of the structure or characteristics of one embodiment may be included in a different embodiment or replaced with the corresponding structure or characteristics of the different embodiment. It is apparent that an embodiment may be constructed by combining those claims not explicitly referencing to each other within the technical scope of the present invention or included as a new claim by amendment after patent application.

The embodiments of the present invention may be implemented by various means, for example, hardware, firmware, software, or a combination thereof. In the case of hardware implementation, one embodiment of the present invention may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processor, controller, micro-controller, and micro-processor.

In the case of software implementation, one embodiment of the present invention may be implemented in the form of a module, procedure, or function which performs the function or operations described above. Software codes may be executed by a processor stored in the memory. The memory may be located inside or outside the processor and may exchange data with the processor by using already-known various means.

It should be clearly understood by those skilled in the art that the present invention may be embodied in a different specific form as long as the embodiment does not lose essential characteristics of the present invention. Therefore, the detailed descriptions above may not be interpreted as limiting the present invention in any aspects but should be regarded as being illustrative. The technical scope of the present invention should be determined according to rational interpretation of appended claims, and all changes within the equivalent scope of the present invention should be included in the technical scope of the present invention.

INDUSTRIAL APPLICABILITY

A method for performing positioning in a wireless communication system according to the present invention has been described with an example applied to the 3GPP LTE/LTE-A system, but the present invention may also be applied to various wireless communication systems in addition to the 3GPP LTE/LTE-A system.

The invention claimed is:

1. A method for estimating a position of a first user equipment (UE) in a wireless communication system, the method performed by an evolved Node B (eNB) and comprising:
   receiving a positioning request message related to position estimation from the first UE;
   transmitting an anchor request message to one or more neighboring UEs within a cell to find UEs which may become at least one second UE,
   wherein the at least one second UE holds its own position information and can support the position estimation of the first UE;
   receiving an anchor response message corresponding to the anchor request message from at least one UE among the one or more neighboring UEs which may become the at least one second UE;
   determining the at least one second UE based on the received anchor response message; and
   transmitting, to the at least one second UE, a position request message for commanding the at least one second UE to transmit position information of the at least one second UE to the first UE by using a device-to-device (D2D) communication to enable the first UE to perform a position estimation of the first UE,
   wherein the position estimation is performed by the first UE by applying a weight to the position information of the at least one second UE and averaging the position information of the at least one second UE to which the weight is applied, and
   wherein the weight is determined according to a quality of a signal received from the at least one second UE.

2. The method of claim 1, wherein the anchor response message further comprises coverage restriction information so that only those UEs satisfying a specific condition among the one or more neighboring UEs transmit the anchor response message.

3. The method of claim 2, wherein the coverage restriction information is approximate position information of the first UE, and the specific condition requires that difference in distance from an approximate position of the first UE is smaller than a threshold value.

4. The method of claim 3, wherein the approximate position information of the first UE is position information measured on the basis of a positioning reference signal (PRS).

5. A method for estimating a position of a first user equipment (UE) in a wireless communication system, the method performed by the first UE and comprising:
- receiving a discovery signal from at least one second UE within a predetermined distance from the first UE,
- wherein the at least one second UE holds its own position information and can support position estimation of the first UE, and
- wherein the discovery signal comprises position information of the at least one second UE; and
- estimating the position of the first UE by applying a weight to the position information of the at least one second UE and averaging the position information of the at least one second UE to which the weight is applied,
- wherein the weight is determined according to a quality of a signal received from the at least one second UE.

6. The method of claim 5, wherein the discovery signal is received through a specific area of a discovery signal resource area, and the specific area is a resource area defined only for the at least one second UE to transmit the discovery signal.

7. The method of claim 6, wherein the discovery signal is a periodic discovery signal.

8. The method of claim 1, wherein the position estimation is performed by the first UE by using the following mathematical equation:

$$X_t = \frac{w_1 X_1 + w_2 X_2 + \ldots + w_k X_K}{K}$$

wherein $X_t$ is the estimated position of the first UE, $X_K$ is position information collected from a k-th at least one second UE, and $w_k$ is a weight related to quality of a signal received from the k-th at least one second UE.

9. A user equipment (UE) performing positioning for estimating a position in a wireless communication system, comprising:
- an RF (Radio Frequency) unit for transmitting and receiving a radio signal; and
- a processor being connected functionally to the RF unit and controlling the UE, wherein the processor is configured:
  - to receive a discovery signal from one or more neighboring UEs within a predetermined distance from the UE,
  - wherein the discovery signal comprises position information of the one or more neighboring UEs; and
  - to control the UE to estimate the position of the UE by applying a weight to the position information of the at least one second UE and averaging the position information of the at least one second UE to which the weight is applied,
  - wherein the weight is determined according to a quality of a signal received from the at least one second UE.

10. The UE of claim 9, wherein the discovery signal is received through a specific area of a discovery signal resource area, and the specific area is a resource area defined only for the at least one second UE to transmit the discovery signal.

11. The method of claim 5,
wherein the position estimation is performed by the first UE by using the following mathematical equation:

$$X_t = \frac{w_1 X_1 + w_2 X_2 + \ldots + w_k X_k}{K}$$

wherein $X_t$ is the estimated position of the first UE, $X_K$ is position information collected from a k-th at least one second UE, and $w_k$ is a weight related to quality of a signal received from the k-th at least one second UE.

12. The UE of claim 9, wherein processor is configured to perform the position estimation by using the following mathematical equation:

$$X_t = \frac{w_1 X_1 + w_2 X_2 + \ldots + w_k X_k}{K}$$

wherein $X_t$ is the estimated position of the first UE, $X_K$ is position information collected from a k-th at least one second UE, and $w_k$ is a weight related to quality of a signal received from the k-th at least one second UE.

13. The method of claim 1, wherein the at least one second UE comprises at least two second UEs.

14. The method of claim 5, wherein the at least one second UE comprises at least two second UEs.

15. The UE of claim 9, wherein the at least one second UE comprises at least two second UEs.

* * * * *